Patented Nov. 10, 1925.

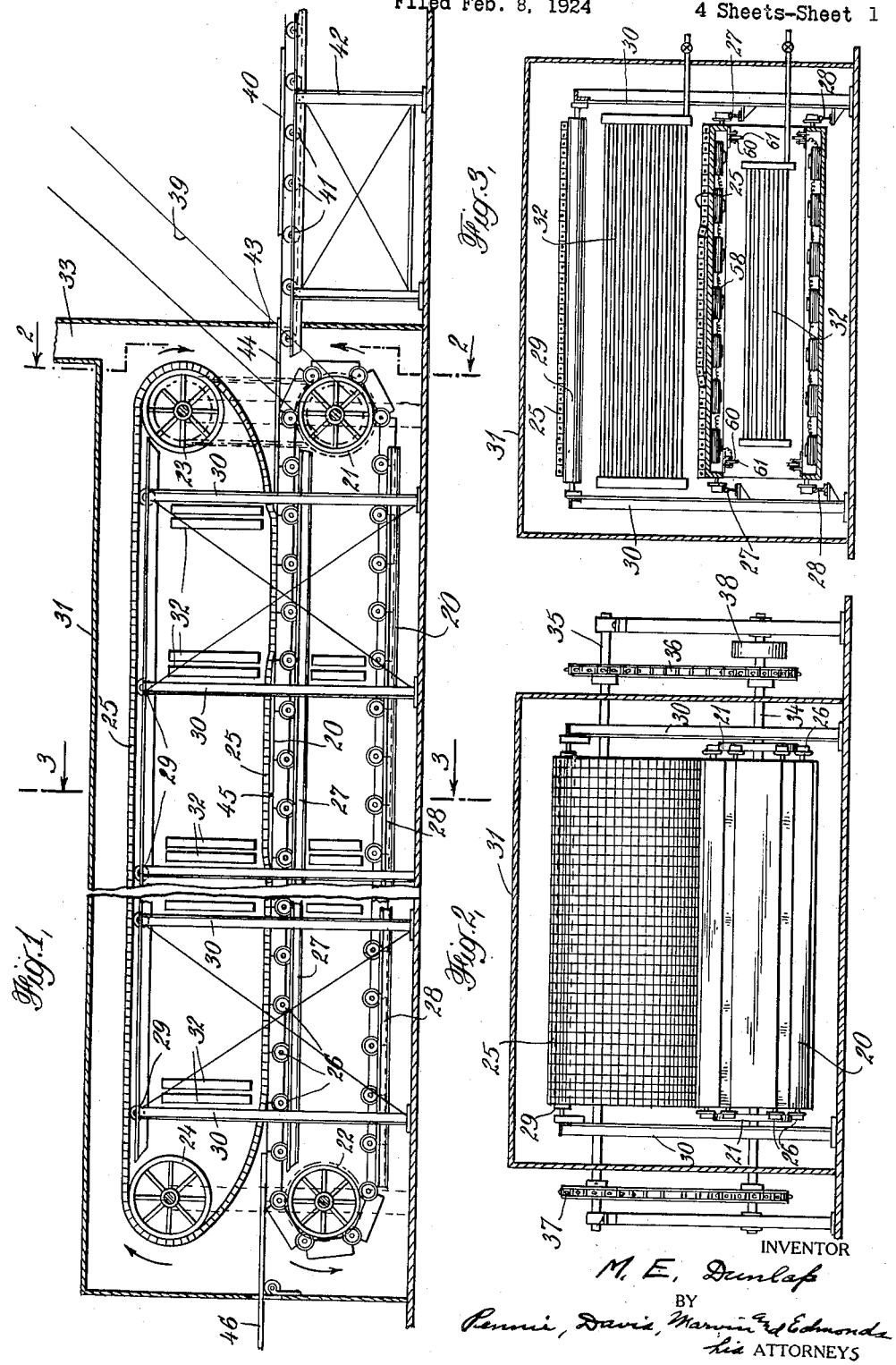

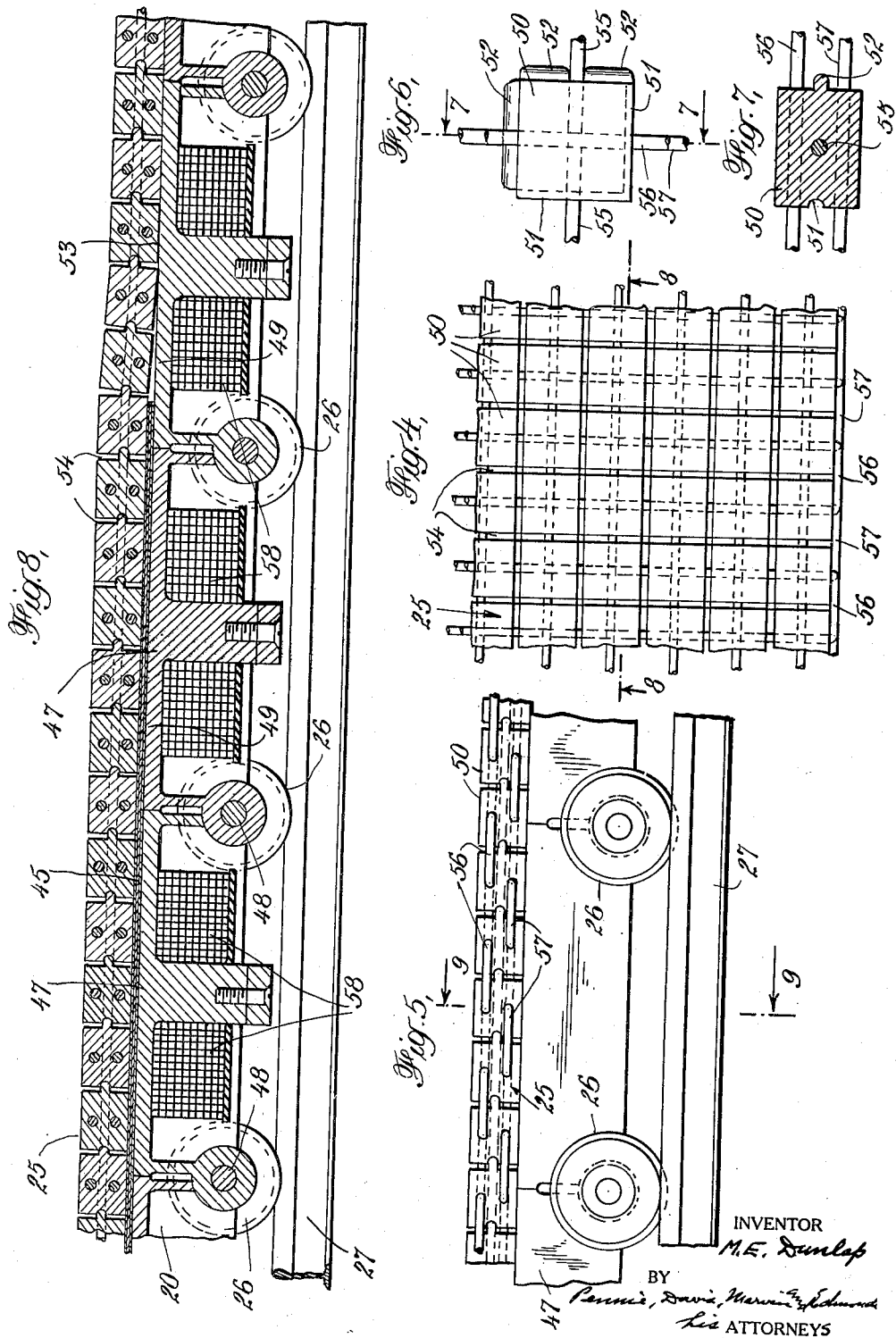

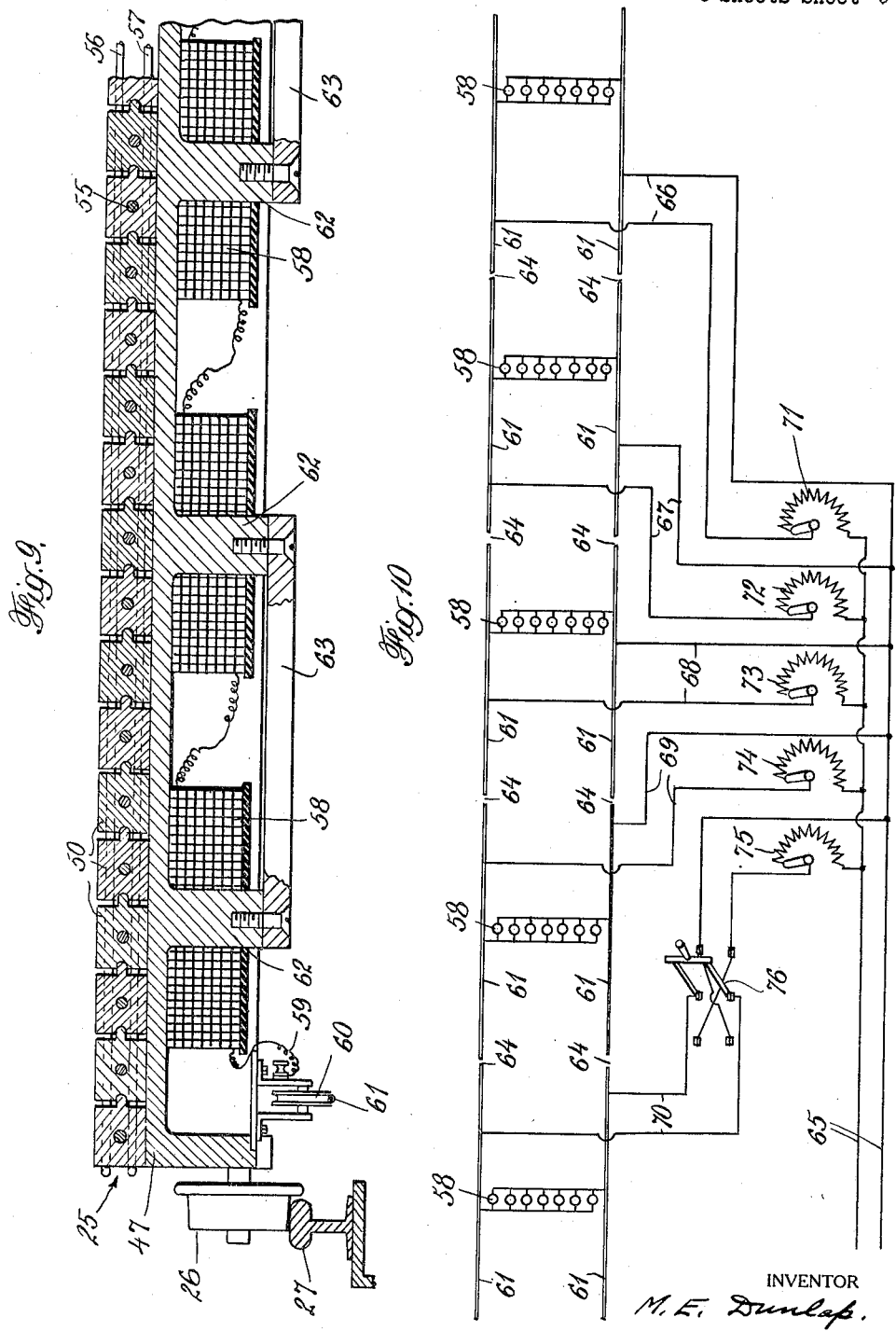

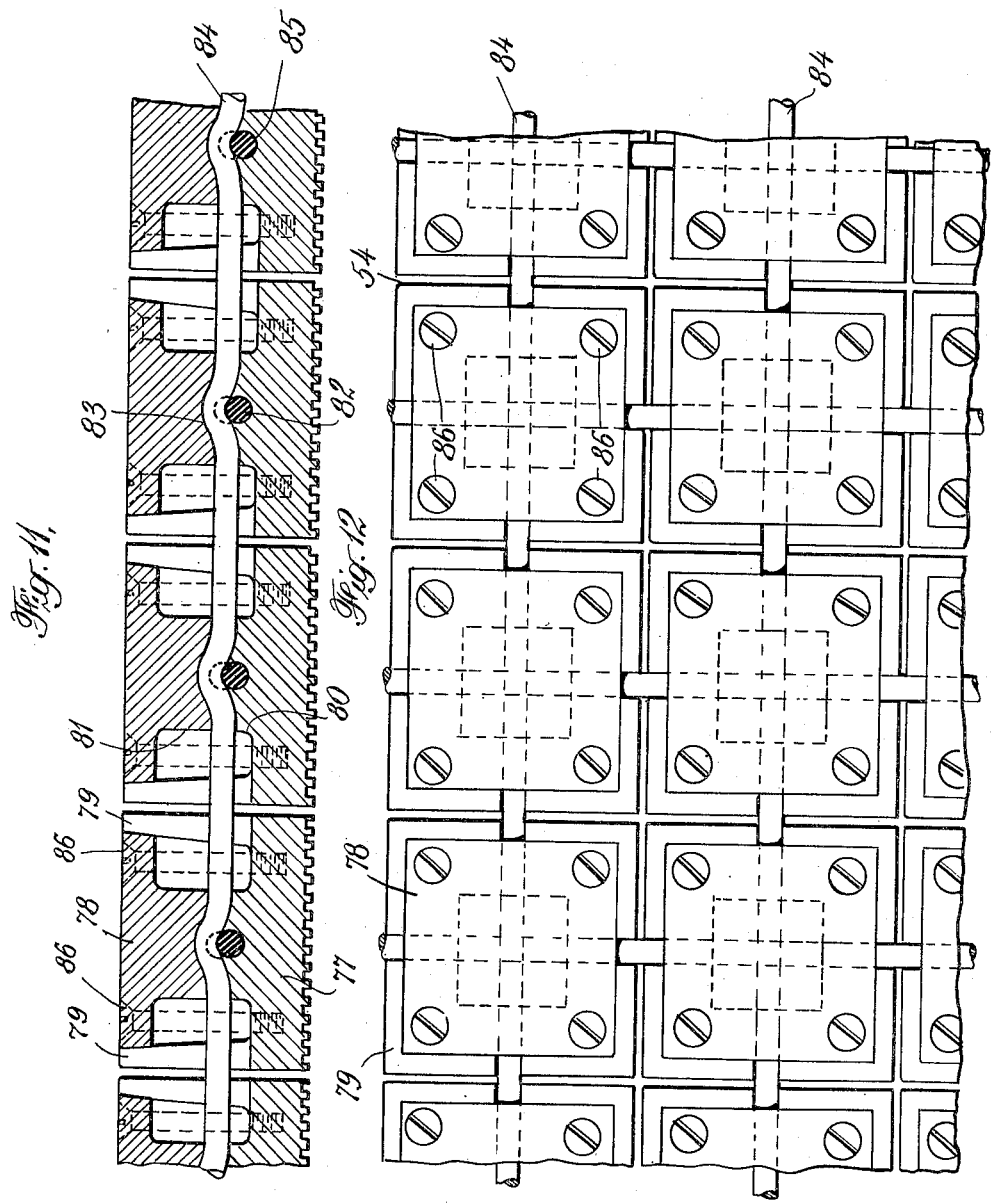

1,561,063

UNITED STATES PATENT OFFICE.

MATTHEW ELBRIDGE DUNLAP, OF MADISON, WISCONSIN.

METHOD AND APPARATUS FOR MAKING PLYWOOD.

Application filed February 8, 1924. Serial No. 691,391.

*To all whom it may concern:*

Be it known that I, MATTHEW ELBRIDGE DUNLAP, a citizen of the United States, residing at Madison, in the county of Dane, State of Wisconsin, have invented certain new and useful Improvements in Methods and Apparatus for Making Plywood; and I do hereby declare the following to be a full, clear, and exact description of the invention, such as will enable others skilled in the art to which it appertains to make and use the same.

This invention relates to the manufacture of plywood, and, more particularly, to the pressing of layers, sheets, or plies of wood, or the like, into panels. The invention has for its object the provision of an improved method and apparatus for pressing layers of such material into panels.

While the invention will be described particularly in connection with the manufacture of plywood, it is not restricted to this use and can be employed in the manufacture of other articles, such, for example, as paper or fiber products, wall board, and the like.

Plywood is made by gluing together under pressure a plurality of plies, or layers, of wood. The panels formed in this manner usually contain an odd number of plies in order that the panel may be symmetrical and the plies are also usually arranged so that the directions of grain of the wood of adjacent layers are approximately at right angles to one another. In this way the completed panel is homogeneous and uniform in strength in all directions, and its tendency to warp is reduced to a minimum.

In the manufacture of plywood, the plies or layers of which the panel is to be made are first coated with an adhesive by some appropriate means, such as a pair of rollers the surfaces of which are uniformly supplied with glue, or the like. These plies, layers, or sheets of wood thus coated with glue are then assembled into a panel of the desired thickness or number of layers. A number of panels are built up in this manner and they are stacked one upon the other until the stack is large enough to place in a hydraulic press. Ordinarily the panels are grouped in this stack with three to five in a set and with a caul board placed between sets. The caul is usually one or one and one-half inches in thickness and is made as true and accurately as possible so that when it is placed in the stack it will assist in distributing the pressure evenly and insure flat panels free from surface irregularities. The stack of panels is built up and placed in the press as soon as possible, but a relatively long time is usually consumed by the spreading of the glue—from a few minutes to a half-hour, or longer. Hence, the glue on the panels of the stack which were assembled first will have some opportunity to set before the stack is pressed, the result being that the gluing of the panels in one portion of the stack may be considerably different from the gluing of the panels in another portion of the stack.

After the proper pressure has been applied in the hydraulic press, this pressure being watched by means of a pressure gauge and suitably and accurately regulated, clamping means are applied to the stack and it is removed to storage space to permit the glue to set or become sufficiently hard to hold the plies securely together. This period requires twelve to twenty-four hours after which the retaining clamps are removed and the panels are open-piled on cars and placed in a kiln to dry, or the panels are open-piled in a conditioning room to air season and give off the moisture added by the glue.

In another method of pressing the stacks of panels, the stacks are allowed to remain in the presses until the glue is set. When this method is employed, the presses are usually of the hand screw type with no means for measuring accurately the amount of pressure applied.

It is important that the correct amount of pressure be employed as it has been found that both insufficient pressure and excessive pressure produce weak glue joints. Moreover, the correct pressure varies with the characteristics of the wood, the kind of glue used, and whether the panels are pressed hot or cold. It is therefore important to be able to know exactly what pressure is being applied to the panels and to be able to vary and control this pressure accurately and within relatively wide limits, for example, from about 75 pounds to about 400 pounds per square inch of panel surface.

In addition to these considerations, it is important that the temperature to which the panels are subjected during the drying operation be maintained substantially constant at approximately 120° F., and, further, that a constant maximum relative humidity be maintained in the drying atmosphere. In this way the panels will be dried down to the final degree of dryness desired without allowing an appreciable amount of further drying below the required moisture content.

In accordance with my invention, a relatively thin stack of panels, or of layers, is subjected to appropriate pressure between traveling perforated surfaces while exposing these relatively thin stacks to a drying atmosphere. The pressure upon the opposite surfaces of the stack is preferably obtained electromagnetically, and, again, the electromagnetic flux preferably passes through the stack of layers under pressure.

A pair of endless platens are arranged to travel in cooperation with one another, preferably through a drying chamber. They are adapted to carry between them a plurality of panels to be pressed which are preferably fed singly between the cooperating portions of these platens. Two or more panels may, however, be placed on top of one another and fed between the platens provided such a stack is kept relatively thin, say, for example, within the limits of an inch or so in thickness. One of these platens is so supported that its working or cooperating portion is a substantially rigid and flat surface in order to maintain the flat shape of the panels. The other platen is constructed of relatively small sections flexibly connected together in slightly spaced relation so as to allow the platen to conform to the surface of the panels and to facilitate the escape of moisture therefrom. The pressure between these cooperating platens may be produced in various ways, but preferably the platens are either constructed of or contain a substantial amount of magnetizable material, and means are provided for creating a magnetic flux within the platens which forces them together so as to exert gluing pressure upon the panels between them while they are traveling through the drying chamber and exposed to the drying atmosphere therein.

The invention will be better understood by referring to the accompanying drawings illustrating, by way of example, one embodiment of the invention, and in which—

Fig. 1 is a view in longitudinal section through the apparatus;

Fig. 2 is a view partially in elevation and partially in section, taken on the line 2—2 of Fig. 1;

Fig. 3 is a view in transverse section taken on line 3—3 of Fig. 1;

Fig. 4 is a fragmentary plan view of a portion of the upper or flexible platen;

Fig. 5 is an enlarged view in side elevation of a portion of the cooperating lower or rigid platen and the upper or flexible platen, showing particularly the arrangement of the transverse cables by which the sections of the flexible platen are joined;

Fig. 6 is a plan view of one of the elements or sections of which the upper platen is built up;

Fig. 7 is a view in section taken on the line 7—7 of Fig. 6;

Fig. 8 is a view of the upper and lower platens in longitudinal section taken on the line 8—8 of Fig. 4;

Fig. 9 is a view of the platens in transverse section taken on the line 9—9 of Fig. 5;

Fig. 10 is a diagram of the electrical connections for supplying energy to the magnetizing coils; and Figs. 11 and 12 are views in longitudinal section and plan respectively of a portion of a flexible platen made up of a modified form of elements or sections.

Referring to these drawings, there is here shown a lower or relatively rigid platen 20 which is built up of a plurality of similar sections hinged together to form an endless chain or apron passing over the supporting drums 21 and 22. Above the drums 21 and 22 there are a second set of drums 23 and 24 over which there passes an upper or relatively flexible endless platen 25. These two platens are substantially the same width and may be made as wide as necessary to accommodate the size of panels to be pressed and as determined by such practical considerations as those of space, cost, and convenience of operation.

The hinged sections of which the lower platen is made up have friction reducing rollers or wheels 26 at their joints by which the platen is supported intermediate the drums 21 and 22 upon the rail sections 27 located along each side of the platen and which constrain the platen to move along its upper or working path with its surface substantially flat and rigid. The elevation of these rail sections 27 is nicely adjusted to maintain the upper surface of the platens flat. Similar rail sections 28 are provided for the platen 20 along its lower or return path.

The working or cooperating portion of the upper platen 25 rests upon the upper surface of the platen 20 or upon the surface of the panels being pressed between the platens. The portion of this upper platen which is returning from the drum 24 to the drum 23 is supported by suitable friction reducing rollers 29.

The supporting drums, rollers, tracks, and other operating portions of the apparatus are supported by suitable framework 30 and the whole is enclosed within an appropriate housing or casing 31 to facilitate the control of the temperature and humidity conditions to which the panels are subjected. For this purpose the heating coils 32, which are adapted to receive steam or other appropriate heating medium, are provided. An exit flue 33 carries off the moisture escaping from the wood, this flue preferably being located near the end of the apparatus to which the unpressed panels are fed. A plurality of such flues can be provided, if desired.

Motion is imparted to the platens 20 and 25 through the supporting drums 21 and 23 respectively. The shafts 34 and 35 of these supporting drums are mechanically connected together by means of the chains 36 and 37 which are carried by appropriate sprocket wheels, and thus the two platens are driven in unison so that their cooperating portions move at the same speed and do not move relative to one another. The whole apparatus is driven in any appropriate manner by mechanism which will operate it so as to drive the platens at the speed desired. Such mechanism is illustrated—entirely diagrammatically, however—by the pulley 38 and belt 39.

During the operation of the apparatus the panels which have been made up of the desired number of layers of wood veneer, or other material, and to the surface of which a suitable adhesive, such, for example, as glue, has been appropriately applied, are fed between the platens 20 and 25 at one end of the machine. In the drawings (Fig. 1) the feeding end is at the right. Such an unpressed panel is indicated at 40, and is being carried over the rollers 41 of the feed table 42 toward the entrance opening 43 of the apparatus. A panel 44 has been fed to the machine just previously to the panel 40 and is just coming into engagement with the flexible platen 25. Preceding the panel 44 is a third panel 45 which has progressed partway through the improved pressing and drying apparatus, and a fourth panel 46 is emerging from the end of the machine in completely dried condition and ready for immediate use.

Referring now to Figs. 4 to 9 of the accompanying drawings, the lower platen 20 is made up of a plurality of sections 47 constructed of preferably relatively soft and easily magnetizable material, such as annealed iron. These sections are so constructed, as shown in Fig. 8, and their hinges 48 are so disposed, that when the supporting wheels 26 are resting upon the level track 27, the upper surfaces 49 of each section are in accurate alignment so that the sections 47 resting upon these rails 27 present a substantially flat and rigid bed or table upon which to feed the panels to be pressed. The length of the sections 47 is relatively great with respect to their width, as is seen by comparing Figs. 8 and 9, the length of these sections being determined by the width of platen desired.

The upper or relatively flexible platen 25 is built up of a plurality of relatively small elements or sections, as illustrated, for example, in Figs. 6 and 7. These sections 50 are also made of a readily magnetizable material and may be of the same material as the lower platen. In the form here illustrated, the sections 50 are provided on two of their edges with grooves 51, and upon the two opposite edges with tongues 52, the form of these grooves and tongues being geometrically similar so that when the sections 50 are assembled to form the platen 25, the tongues of each section will enter the grooves of the adjacent sections and thus serve to give continuity to the lower working surface 53 of this upper platen, and also to maintain the sections 50 in spaced relation with one another so as to provide the interspaces, or passageways, 54 between the sections for the escape of moisture from the upper surface of the panel 45 which is being pressed. The coacting surfaces of these tongues 52 and grooves 51, however, are such as to allow a slight rotation of the elements with respect to their neighbors about these coacting surfaces with relatively little friction. The elements 50 are held together to form the platen 25 by means of longitudinal cables 55 and transverse cables 56 and 57. Longitudinal cables 55 are preferably endless and pass around the supporting drums 23 and 24. These cables pass directly through the center of each block or element 50, as shown in Fig. 7. The transverse cables 56 and 57 pass through the blocks 50 above and below the cables 55 and the method of threading these cables back and forth throughout the width of the platen is shown particularly in Figs. 4 and 5.

In order to electromagnetically apply the pressure between the upper and lower platens, suitable magnetizing coils are provided to cause magnetic flux to pass in an appropriate manner through the two platens and preferably also through the panels being pressed, which are located between the platens. In the embodiment of the invention which is illustrated in the drawings, these magnetizing coils are associated with the lower platen 20 and are indicated by the numeral 58, in Figs. 8 and 9. When these magnetizing coils are energized by causing an electric current to flow through them, a magnetic flux will be produced within both platens and as a result the platens will be drawn together under a pressure depending upon the ampere-turns in the magnetizing coils and the thickness of the panels placed between the platens. The relatively flexible construction of the platens above described will allow the upper platen to conform to the upper surface of the panel to be pressed and the panels of substantially different thicknesses can even be passed through the apparatus simultaneously and disposed relatively close to one another.

The coils 58 which are located upon each section 47 may be connected either in series or in parallel, but preferably they are connected in series, as shown in Fig. 9, and the terminal 59 of each of the end coils is carried to a trolley wheel 60 one of which is located at each end of the platen section. During the working movement of the platen section, each of the trolley wheels 60 is in engagement with a feed conductor such as the wire 61. In order to increase the permeability of the path of the magnetic flux, the cores 62 of the magnetizing coils 58 may be joined by a suitable bar 63 of magnetic material, such as iron, as shown in Fig. 9.

The control of the amount of pressure which it is desired to exert upon the panels to be pressed is secured by regulating the amount of current passing through the magnetizing coils, and a means for effecting this regulation is illustrated in the connection diagram of Fig. 10. Here the conductors 61 are divided into a plurality of insulated sections which are isolated electrically from each other by means of the air gaps or section insulators 64. Each of these insulated sections is supplied with current from the supply conductors 65 through separate pairs of conductors 66, 67, 68, 69, and 70, respectively, and in each of these circuits there is placed a suitable rheostat indicated at 71, 72, 73, 74, and 75. Hence, by appropriately manipulating the handles of these rheostats, the currents traversing the coils 58 can be varied and the pressure applied to the panels increased or diminished as the panels progress through the press. It will be noticed that in Fig. 10, the coils 58 are connected in parallel, but they could, of course, as well be connected in series.

As the sections of the platens approach the discharge end of the press, the current from the coils 58 is interrupted either by means of the switches attached to the rheostats or by suitable automatic switching arrangements. Inasmuch as the residual magnetism remaining in the platens 20 and 25 after the cutting off of the magnetizing current may tend to interfere with the separation of the platens, the current through the magnetizing coils may be reversed for an instant to annihilate this residual magnetism. For this purpose a switch 76 is connected in the circuit 70 of the last section of the conductor 61.

In Figs. 11 and 12 a modified form of block or element for the flexible platen is illustrated. This block comprises a lower section 77 and an upper section 78. The lower section has a projecting marginal portion 79 which extends upwardly approximately to the level of the upper surface of the upper section 78, when it is in position. Thus, the upper section 78 is received within the marginal portion 79, as may be seen in Fig. 12. The two sections 77 and 78 are provided with interiorly projecting lugs 80 and 81 respectively which have grooves 82 and 83 extending crosswise thereof and at right angles to each other of about the size of the cables 84 and 85.

In assembling these elements into a flexible platen, the longitudinal cables 84 are first placed on suitable supports and spaced from each other slightly more than the thickness of the sections. The transverse cables 85 are also placed upon supports which hold them in similarly spaced relation to one another. Then a pair of sections 77 and 78 is clamped about the cables at each intersection and held firmly in place by means of the four screws 86 which are provided for this purpose. In clamping these sections upon the intersections of the cables 84 and 85 they are spaced from one another as indicated in the drawings so as to provide a space between them similar to the spaces 54 of Fig. 4 to allow for the exit of moisture from the surface of the panels. This modified form of block enables the construction of a particularly flexible platen with comparative ease.

In the pressing of plywood or like panels in accordance with the principles of my invention, the moisture is removed from the panels at a more rapid rate than has heretofore been possible without injury to the finished product, and in addition, the moisture is removed uniformly and the result is a particularly well glued panel. The process involves no handling of the material of which the panels are made after it enters the pressing machine or of the numerous accessories such as cauls, retaining clamps, and the like. The assembled panels ready to be pressed are fed to the machine continuously and successively and emerge from the machine as a finished product ready for shipment or for fabrication. The handling of the stacks of panels, with their retaining clamps, between the hydraulic press and the drying room is eliminated. Furthermore, the amount of pressure is under the ready control of the operator and may always be accurately known by him by the indications of current indicating devices placed in the circuits of the magnetizing coils in a well understood manner. Moreover, the amount of pressure applied during the different stages of the drying can be varied in order to secure the most effective treatment of the material.

The apparatus of my invention does not require the use of any particular glue, but renders it possible to use various kinds of glues, such, for example, as animal, vegetable, blood albumen, or casein glues, in the process of making plywood. There is also the extremely important advantage of securing uniform pressure evenly distributed over the whole surface of the panel, and applying this pressure immediately after the glue is spread, thus doing away with the necessity of waiting a relatively long time before a bundle, or stack, of panels is made up and partial setting up or drying of the glue has taken place before the pressure is applied.

Also, this apparatus makes practical the manufacture of panels in sizes smaller than are more commonly made. Since there is but one handling of the material, the apparatus provides economy of labor even with small panels.

I claim:

1. A machine for pressing layers of wood or the like into panels comprising cooperating platens adapted to receive the layers of wood between them, and means for magnetically urging the platens toward each other to exert gluing pressure upon the layers.

2. A machine for pressing layers of wood or the like into panels comprising a pair of traveling endless platens adapted to receive the layers of wood between them, and means for magnetically urging the platens toward each other to exert gluing pressure upon the layers.

3. A machine for pressing layers of wood or the like into panels comprising a pair of traveling endless platens adapted to receive the layers between them, the cooperating portion of one of said platens being constrained to form a substantially rigid and flat surface, and the other platen being relatively flexible, and means for magnetically urging the platens toward each other to exert gluing pressure upon the layers.

4. A machine for pressing layers of wood or the like into panels comprising a pair of traveling endless platens adapted to receive the layers between them, the cooperating portion of one of said platens being constrained to form a substantially rigid and flat surface, and means for magnetically urging the platens toward each other to exert gluing pressure upon the layers, the second platen being sufficiently flexible to permit the simultaneous pressing of layers of different thicknesses.

5. A machine for pressing layers of wood or the like into panels comprising cooperating endless platens containing magnetizable material and adapted to receive the layers between them, and means for magnetizing the platens to cause them to be forced toward each other so as to exert gluing pressure upon the layers.

6. A machine for pressing layers of wood or the like into panels comprising cooperating endless platens containing magnetizable material and adapted to receive the layers between them, one of said platens being provided with one or more magnetizing coils for magnetizing the platens so as to force them toward each other and exert gluing pressure upon the layers.

7. A machine for pressing layers of wood or the like into panels comprising a pair of traveling endless platens containing magnetizable material adapted to receive the layers between them, and one of said platens being provided with one or more magnetizing coils for creating a magnetic flux within the platens to force them together so as to exert gluing pressure upon the layers, and means for supplying electrical energy thereto.

8. In a machine for pressing layers of wood or the like into panels, a traveling endless platen comprising sections hinged together and provided with electromagnets, and a relatively flexible platen containing magnetic material and cooperating therewith, and means for energizing the electromagnets to cause the platens to be drawn toward each other to exert the desired pressure upon the layers.

9. In a machine for pressing layers of wood or the like into panels, a pair of endless platens, means for driving said platens at the same speed and in contact respectively with the opposing surfaces of the panel to be pressed, one of said platens containing electromagnets and the other being constructed of relatively numerous sections of magnetic material flexibly connected together, and means for energizing the electromagnets to exert the desired pressure upon the panels.

10. A machine for pressing layers of wood or the like into panels comprising a drying chamber having cooperating platens therein adapted to receive the layers between them, and means for magnetically forcing the platens toward each other to exert gluing pressure upon the layers while exposing them to a drying atmosphere.

11. A machine for pressing layers of wood or the like into panels comprising a pair of endless platens arranged to travel through a drying chamber and carry between them a plurality of panels to be pressed which are successively fed thereto, and means for magnetically forcing the platens toward each other to exert a gluing pressure upon the panels while exposing them to the drying atmosphere.

12. A machine for pressing layers of wood or the like into panels comprising a pair of endless platens arranged to travel within a drying chamber and carry between them a plurality of panels to be pressed successively fed to the platens, the cooperating portion of one of the platens being constrained to form a substantially rigid and flat surface, and the other platen being relatively flexible, and means for magnetically forcing the platens toward each other to exert gluing pressure upon the panels while exposing them to the drying atmosphere.

13. A machine for pressing layers of wood or the like into panels comprising a pair of endless platens arranged to travel within a drying chamber and carry between a plurality of panels to be pressed successively fed to the platens, the cooperating portion of one of the platens being constrained to form a substantially rigid and flat surface, and the other platen being sufficiently flexible to permit the simultaneous pressing of panels of substantially different thicknesses, and means for magnetically forcing the platens toward each other to exert gluing pressure upon the panels while exposing them to the drying atmosphere.

14. A machine for pressing layers of wood or the like into panels comprising cooperating endless platens containing magnetizable material and arranged to travel through a drying chamber and to carry between them the panels to be pressed, and means for magnetizing the platens to cause them to be forced toward each other so as to exert gluing pressure upon the panels while exposing them to the drying atmosphere.

15. A machine for pressing layers of wood or the like into panels comprising cooperating endless platens containing magnetizable material and arranged to travel through a drying chamber and to carry between them a plurality of panels to be dried successively fed between the platens, one of the platens being provided with one or more magnetizing coils for magnetizing the platens to cause them to be forced toward each other to exert gluing pressure upon the panels while exposing them to the drying atmosphere.

16. A machine for pressing layers of wood or the like into panels comprising a pair of endless platens arranged to travel through a drying chamber and adapted to receive between them a plurality of panels to be pressed and carry them through said chamber, one of the platens being provided with magnetizing coils, and means for supplying electrical energy thereto to produce a magnetic flux within the platens and urge them toward each other so as to exert gluing pressure upon the panels while exposing them to the drying atmosphere.

17. In a machine for pressing layers of wood or the like into panels, an endless platen comprising, sections hinged together and provided with electromagnets, and a relatively flexible platen containing magnetic material cooperating therewith, the cooperating portions of said platens being arranged to travel within a drying chamber and carry between them a plurality of panels to be pressed, and means for energizing the electromagnets so as to exert the desired pressure upon the panels while exposing them to the drying atmosphere.

18. In a machine for pressing layers of wood or the like into panels, a drying chamber, a pair of endless platens therewithin, means for driving the platens at the same speed and in contact respectively with the opposing surfaces of a plurality of panels to be pressed fed therebetween, one of said platens containing electromagnets and the other being constructed of relatively numerous sections of magnetic material flexibly connected together, and means for energizing the electromagnets to cause the platens to exert the desired pressure upon the panels while exposing them to the drying atmosphere.

19. In a machine for pressing layers of wood or the like into panels, a drying chamber, and a pair of endless platens having their cooperating portions traveling through said chamber, one of the platens comprising sections hinged together and provided with magnetizing coils, and the other platen comprising relatively small sections of magnetizable material flexibly connected together, and means for energizing the magnetizing coils to cause the platens to exert the desired pressure upon the panels while exposing them to a drying atmosphere, the sections of the flexible platen having passageways between them to facilitate the escape of moisture from the surfaces of the panels.

20. In a machine for pressing layers of wood or the like into panels, a drying chamber, a pair of cooperating platens containing magnetizable material adapted to travel therethrough and carry between them a plurality of panels to be pressed, magnetizing coils for creating magnetic flux within said platens so as to exert gluing pressure upon the panels while they are passing through the drying chamber, and means for controlling the magnetic flux so as to vary the pressure applied to the panels at different portions of their path through the chamber.

21. In a machine for pressing layers of wood or the like into panels, a traveling endless platen comprising hinged sections of magnetizable material, each of the sections being provided with a plurality of magnetizing coils, a stationary feed wire disposed parallel with each side of the platen, contacts coacting therewith and mounted one at each end of the hinged sections by which the energy is supplied to the coils, and a relatively flexible platen cooperating with the first platen and comprising a plurality of relatively small sections of magnetizable material flexibly connected together, the platens being adapted to press the layers of wood between them when the magnetizing coils are energized.

22. A flexible platen for a machine for pressing layers of wood or the like into panels comprising a plurality of spaced longitudinally disposed cables, a plurality of transversely disposed cables, and a plurality of separable metallic sections clamped to both of said cables at their intersections.

23. A flexible platen for a machine for pressing layers of wood or the like into panels comprising a plurality of spaced longitudinally disposed cables, a plurality of transversely disposed cables, and a plurality of separable metallic sections clamped to both of said cables at their intersections, the sections when clamped in position being spaced from one another to provide passageways for the moisture escaping from the panels.

24. A flexible platen for a machine for pressing layers of wood or the like into panels comprising a plurality of spaced longitudinally disposed cables, a plurality of transversely disposed cables, and a plurality of separable metallic sections clamped to both of said cables at their intersections, the cooperating faces of the sections being corrugated to provide passageways for the escape of moisture from the surfaces of the panels.

25. In a machine for pressing layers of wood or the like into panels, a pair of cooperating pressure elements adapted to be brought into contact with the opposing surfaces of the panels to be pressed, and means for exerting a gluing pressure upon said surfaces by a magnetic flux passing through the panels.

26. A machine for pressing layers of wood or the like into panels comprising, a pair of traveling endless platens adapted to have the panels to be pressed continuously fed between them, one of said platens being supported to form a substantially rigid and flat surface for the panels and the other platen being flexible in two directions so as to adapt itself simultaneously to panels of substantially different thicknesses and having numerous passageways therethrough to provide for the escape of moisture from the panels, and means for forcing said platens together so as to exert gluing pressure upon the panels.

27. A machine for pressing layers of wood or the like into panels comprising, a pair of traveling endless platens adapted to have the panels to be pressed continuously fed between them, one of said platens being supported to form a substantially rigid and flat surface for the panels, and the other platen comprising a plurality of spaced longitudinally disposed cables, a plurality of transversely disposed cables, and a plurality of metallic sections secured to said cables at their intersections, said sections being spaced from one another to provide flexibility and to allow the excape of moisture, and means for forcing said platens together so as to exert gluing pressure upon the platens.

28. The method of pressing layers of wood or the like into panels which comprises electromagnetically applying pressure to a relatively thin stack of layers while exposing them to a drying atmosphere.

29. A flexible platen for a machine for pressing layers of wood or the like into panels comprising a plurality of spaced longitudinally disposed cables, a plurality of transversely disposed cables, and a plurality of metallic sections supported thereby, said sections being secured to said cables at their intersections.

In testimony whereof I affix my signature.

MATTHEW ELBRIDGE DUNLAP.